United States Patent [19]

Mishra et al.

[11] Patent Number: 5,135,996
[45] Date of Patent: Aug. 4, 1992

[54] PROCESS OF MAKING COPOLYMERS FOR VISCOSITY INDEX IMPROVERS

[75] Inventors: Munmaya K. Mishra; Isaac D. Rubin, both of Wappingers Falls; Thomas J. Mach, Warwick, all of N.Y.

[73] Assignee: Texaco Inc., White Plains, N.Y.

[21] Appl. No.: 739,365

[22] Filed: Aug. 2, 1991

[51] Int. Cl.$^5$ .................. C08F 4/06; C08F 220/60; C08F 210/02

[52] U.S. Cl. .................. 526/154; 526/282; 526/305; 526/348.8

[58] Field of Search .................. 526/305

[56] References Cited

FOREIGN PATENT DOCUMENTS 0321624 6/1989 European Pat. Off. .

Primary Examiner—Joseph L. Schofer
Assistant Examiner—Wu C. Cheng
Attorney, Agent, or Firm—Robert A. Kulason; James J. O'Loughlin; Vincent A. Mallare

[57] ABSTRACT

A method of making a VI improver is disclosed. The one-step method of this invention includes reacting ethylene, an olefin other than ethylene and N-phenylphenylene methacrylamide in the presence of a cocatalyst system including a combination of a first group and a second group, said first group consisting of triethylaluminum, ethylaluminum, sesquichloride, diethylaluminum chloride, diethylzinc, ethylzinc chloride, triisobutylaluminum and mixtures thereof, and said second group consisting of titanium trichloride, titanium tetrachloride, vanadium tetrachloride, vanadium oxychloride, tetrabutyl titanate and mixtures thereof.

7 Claims, No Drawings

PROCESS OF MAKING COPOLYMERS FOR VISCOSITY INDEX IMPROVERS

BACKGROUND OF THE INVENTION

The present invention relates generally to viscosity index (VI) improvers and, more particularly, to a one step method for making multifunctional VI improvers whereby the resulting product exhibits improved anti-oxidancy and dispersancy properties and is easy to pour point depress.

One of the known types of VI improvers consists of an ethylene-propylene-(grafted)methacrylate terpolymer. Generally, this VI improver is made in a two-step reaction sequence. More specifically, in a first step, an ethylene and propylene monomer are copolymerized to provide an ethylene-propylene copolymer. In a similar manner, ethylene-propylene-diene containing terpolymers can be provided in the first step. In any event, the polymerization reaction occurs in the presence of a Ziegler-Natta catalyst. In a second step, a methacrylate constituent is grafted onto the backbone of the copolymer or diene containing terpolymer produced in the first step. Free radical catalysts and/or heat must be employed in the second step in order to initiate the grafting reaction.

There are several shortcomings associated with the aforedescribed known method of preparing VI improvers. Specifically, in addition to providing methacrylate grafted terpolymers, a certain portion of the methacrylate monomer will homopolymerize resulting in a methacrylate polymer, which is undesirable for several reasons. First, the reaction product as well as the final oil blend are opaque, hazy and have a tendency to gel. This phenomenon is problematic to the skilled lubricant chemist and is particularly prevalent where the VI improver has a high ethylene:propylene molar ratio. Second, the reaction product includes a fraction which is insoluble or, at best, soluble in the oil with great difficulty. This disadvantage is also attributed to the cross-linking which occurs when the known method is employed. Third, the homopolymerization of the methacrylate monomer renders the known method inefficient and uneconomical, inasmuch as the methacrylate monomer is wasted, where a multifunctional VI improver is desired, when it cannot be grafted onto the ethylene-propylene backbone. The economic liability of the known method is further ascribed to the necessity to produce the VI improver in two steps and by using two distinct catalyst systems.

It is, therefore, our understanding that a one-step, economic and efficient method for making a VI improver which overcomes those shortcomings identified above is highly desired by those skilled in the art and has heretofore been unavailable.

Thus, it is an object of the present invention to provide a one-step polymerization method of preparing a multifunctional VI improver which impacts dispersancy and antioxidancy properties to lubricating oils.

DISCLOSURE STATEMENT

U.S. Pat. application No. 07/481,031 discloses a one-step method of preparing a VI improver which comprises reacting ethylene, an olefin other than ethylene and a third reagent selected from the group consisting of a methacrylate ester, an acrylate ester or a mixture thereof, in the presence of a Ziegler-Natta catalyst. Preferably, the third reagent is a methacrylate ester represented by the structure:

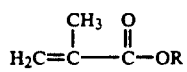

wherein R is a ($C_{12}$-$C_{18}$) alkyl or a mixture thereof.

European Patent Application No. 0 321 624 describes polymeric amides as VI improvers. The described method of preparing the VI improver involves a two-step reaction where, in a first step, a terpolymer of ethylene, with one or more $C_3$ to $C_{28}$ alpha olefins and an ethylenically unsaturated carboxylic ester using a Ziegler-Natta catalyst in a solvent is provided as an intermediate. In a second step, the intermediate is reacted with a polyamine to form an amide and, hence, the VI improver.

SUMMARY OF THE INVENTION

The present invention relates to a method of making a viscosity index improver which comprises reacting, in one step, ethylene, an olefin other than ethylene and a third reagent, N-phenylphenylene methacrylamide or 4-anilinophenyl-methacrylamide, said reaction occurring in the presence of a Ziegler-Natta catalyst. The third reagent, N-phenylphenylene methacrylamide is represented by the formula:

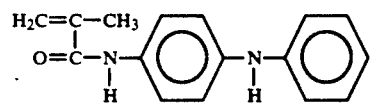

It has advantageously been discovered that the method of this invention provides an economical and efficient means for making a commercially acceptable VI improver, particularly when compared with the VI improvers prepared by the known method described above.

DESCRIPTION OF THE PREFERRED EMBODIMENTS

As stated above, the one-step method of this invention generally includes reacting ethylene with a second olefin other than ethylene and a third reagent, which is N-phenylphenylene methacrylamide in the presence of a Ziegler-Natta catalyst.

The second olefin can be selected from propylene or higher olefins, such as ($C_4$-$C_8$) alpha olefins. In a preferred embodiment, the second olefin is propylene or butene-1, with propylene being the most preferred. Combinations of propylene and small amounts of at least one of the aforestated higher olefins may also be used.

In a preferred embodiment, the N-phenylphenylene methacrylamide, which is incorporated into the polymer chain during the reaction, is represented by the formula:

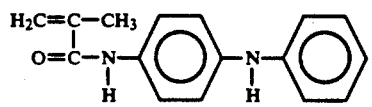

Optionally, the method of this invention can further include reacting a small amount of diene, such as butadiene, 1,4-hexanediene, 5-vinyl-2-norbornene and 5- ethylidene-2-norbornene, with ethylene, the second olefin other than ethylene and the third reagent.

The reaction or method of this invention is conducted in the presence of a Ziegler-Natta catalyst, that is, for example, catalysts formed by the interaction of derivatives of metals in Group I to Group III of the Periodic Table with halides and other derivatives of Group IV to Group VIII metals. While soluble catalysts are preferred to facilitate the incorporation of the resulting VI improver in the lube oil formulation, insoluble catalysts may also be used.

Additionally, the Ziegler-Natta catalyst preferably comprises a cocatalyst system which includes a combination of one or more materials from a first group of compounds with one or more materials from a second group of compounds. The first group can include, for example, triethylaluminum, ethylaluminum sesquichloride, diethylaluminum chloride, diethylzinc, ethyl-zinc chloride, triisobutylaluminum and mixtures thereof. The second group can include vanadium or titanium based catalysts, for example, titanium trichloride, titanium tetrachloride, vanadium tetrachloride, vanadium oxytrichloride, tetrabutyl titanate and mixtures thereof.

Combinations of the two groups which result in amorphous polymers or polymers of low crystallinity are particularly preferred and include, for example, diethylaluminum chloride and vanadium oxytrichloride; ethylaluminum sesquichloride and vanadium oxytrichloride; and diethylaluminum chloride and vanadium tetrachloride.

The foregoing catalyst systems may be improved by the addition of one or more activators to increase yields or to modify polymer properties. As merely illustrative, the activators can be selected from various magnesium compounds, such as magnesium dichloride or butyl ethyl magnesium; tributyl tin phosphite; triethyl thiophosphate; ethyl benzoate and mixtures thereof.

The prescribed reaction can be carried out at a temperature of about $-30°$ C. to about $100°$ C. and at a pressure of about 0 to about 100 psi.

Generally, a Ziegler-Natta catalyst is not used to polymerize a polar monomer, such as a methacrylate or acrylate ester, inasmuch as a polar monomer has a tendency to reduce or destroy its catalytic activity. This can be overcome by adding an excess of the aluminum compound used in the cocatalyst system relative to the amount of ester employed, so that a portion of the aluminum compound will complex with the polar compound, i.e., the methacrylate, thereby avoiding the otherwise adverse affect it has on catalytic activity. This technique is generally recognized as described in the book of Lindsay, G. A., entitled BLOCK COPOLYMERIZATION OF ETHYLENE PROPYLENE, AND ACRYLIC ACID ESTERS [MMI Press Symposium Series 3, p. 53 (1983)].

The VI improver produced in accordance with the method of this invention desirably has an ethylene:propylene molar ratio, where propylene is the second olefin employed, of about 1 to about 5 moles of ethylene to about 5 to about 1 moles of propylene. Additionally, the VI improver should include from about 9.5 to about 77 weight percent of ethylene, from about 15 to about 90 weight percent of propylene, and from about 0.5 to about 8 weight percent of N-phenylphenylene methacrylamide. Preferably, the VI improver includes from about 45 to about 75 weight percent ethylene, from about 20 to about 54.5 weight percent propylene, and from about 0.5 to about 5 weight percent N-phenylphenylene methacrylamide.

The present invention relates to a one-step process for synthesizing a terpolymer of ethylene, propylene, and N-phenylphenylene methacrylamide, sold under the tradename of POLYSTAY$^R$ by Goodyear Tire & Rubber Co. of Akron, Oh. The process is carried out by Ziegler-Natta polymerization to produce a new composition of matter. This terpolymer may be used as a multifunctional VI improver in lubricating oils, which will impart dispersancy and/or anti-oxidancy properties.

This one-step polymerization system gives a soluble terpolymer (OCP) in which the composition can range from 20–80 mole % ethylene, with the other component being preferably propylene and N-phenylephenylene methacrylamide (POLYSTAY$^R$), though other olefins can also be used. The terpolymerizations were carried out as described in the following procedure.

POLYMERIZATION PROCEDURE

A 500 ml. resin kettle with gas inlet and outlet tubes, thermometer, stirrer and one port capped with a rubber septum was thoroughly dried and flushed with dried nitrogen. 120 g of toluene which had been dried over 4Å molecular sieve was added to the kettle which was continuously flushed with nitrogen and stirred. Then about 100g of solution of POLYSTAY$^R$ in toluene which had been dried over anhydrous sodium sulfate was added. The resin kettle was maintained at 20° C. (never below 20° C.). Then the two catalyst components were injected through the septum using syringes in the following sequence: ethylaluminum sesquichloride (EASC) and vanadium oxytrichloride. After about 5 mins. the nitrogen flow was replaced by a gas mixture of ethylene and propylene in a molar ration of 20:80. When the solution was saturated with gases the temperature inside the kettle increased and there was a marked absorption of the gas mixture by the solution. After about three hours the mixture became very viscous. The reaction was terminated by replacing the mixed gas flow with nitrogen and injecting 20 cc of methanol through the rubber septum. The reaction mixture was precipitated into 2000 cc of methanol, and the methanol was decanted. The product was again redissolved in 200 cc of hot toluene, precipitated with methanol, washed again with methanol and dried to constant weight. The product consisted of a pale green rubbery copolymer.

The concentrations of the cocatalysts and POLYSTAY® used in the reaction were as follows:

(Et)$_3$Al$_2$Cl$_3$ —13.66 wt% solution in hexane VOCl$_3$ —25.66 wt% solution in hexane CH$_2$=CH(CH$_3$)—CO—NH—C$_6$H$_4$-NH—C$_6$H$_5$—1.7 wt% solution in toluene (POLYSTAR®)

The reaction (i.e., polymerization scheme) may be illustrated by the following scheme where (EP) is a ethylenepropylene copolymer.

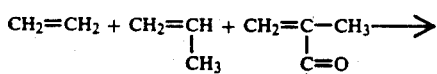

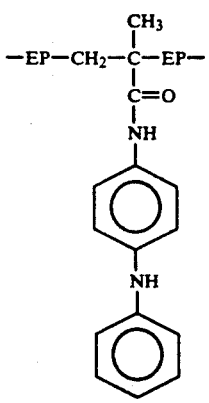

The following Examples 1-6 are provided to further illustrate preferred embodiments of the method of this invention and the VI improvers produced thereby; these examples should not be construed as limiting the present invention in any way.

EXAMPLES 1-6

In order to show the effectiveness of the present materials and one-step process, tests (i.e., runs) were made using different amounts of materials described above. The process used is as described above in POLYMERIZATION PROCEDURE.

The results of the six runs, i.e., tests are provided below in Table I.

TABLE I

| Examples | Terpolymerization Of Ethylene, Propylene, And Polystay ® | | | | | | | | Yield |
|---|---|---|---|---|---|---|---|---|---|
| | EASC | | | VOCl3 | | | Polystay ® | | |
| | S,g | A,g | M × $10^3$ | S,g | A,g | M × $10^3$ | S,g | A,g | g |
| 1. | 13.69 | 1.899 | 7.67 | 1.63 | 0.418 | 2.4 | 93.47 | 1.589 | 9.8 |
| 2. | 13.02 | 1.779 | 7.18 | 1.61 | 0.413 | 2.38 | 97.15 | 1.652 | 11.7 |
| 3. | 13.22 | 1.806 | 7.29 | 1.54 | 0.395 | 2.28 | 97.02 | 1.649 | 10.9 |
| 4. | 14.09 | 1.925 | 7.77 | 1.52 | 0.385 | 2.22 | 95.8 | 1.629 | 13.0 |
| 5. | 13.61 | 1.859 | 7.51 | 1.53 | 0.393 | 2.26 | 95.16 | 1.618 | 9.7 |
| 6. | 13.78 | 1.882 | 7.60 | 1.51 | 0.387 | 2.23 | 92.49 | 1.572 | 12.5 |

S = Amount of solution added to the polymerization system
A = Actual amount of the material present in the solution
M = moles;
Polymerization temp. = 20° C.,
Time = 3 hrs.

As shown in the results of Table I, the optimum amount of POLYSTAR ® needed for provided the best yields is about 1.50 to about 1.63 grams.

The VI improvers produced in Examples 2 and 6 were characterized; the results on two are provided in Table II.

TABLE II

| Product Characteristics | Example 2 | Example 6 |
|---|---|---|
| Weight Average Molecular Weight (Mw) | 207,200 | 232,700 |
| Mole % Ethylene | 55 | 60 |
| Fourier Transform Infrared Spectroscopy (FTIR), C = O | Yes | Yes |
| Weight Percent N-phenylphenylene methacrylamide | 2 | 2 |
| Proton Nuclear Magnetic Resomance Spectroscopy (NMR) | | |
| N—H | Yes | Yes |
| Aromatic | Yes | Yes |

What is claimed is:

1. A method of making a viscosity index improver which comprises reacting, in one step, ethylene, an olefin other than ethylene and N-phenylphenylene methacrylamide, said reaction occurring n the presence of a cocatalyst system including a combination of a first group and a second group, said first group consisting of triethylaluminu, ethylaluminim sesquichloride, diethylaluminum chloride, diethylzinc, ethylzinc chloride, triisolbutylaluminum and mixtures thereof and said second group consisting of titanium trichloride, titanium tetrachloride, vanadium tetrachloride, vanadium oxytrichloride, tetrabutyl titanate and mixtures thereof.

2. The method of claim 1 wherein said olefin other than ethylene comprises propylene, a ($C_4$-$C_8$) alpha olefin or a combination of propylene and at least one of said $C_4$-$C_8$ alpha olefins.

3. The method of claim 2 wherein said ($C_4$-$C_8$) alpha olefin comprises butene-1.

4. The method of claim 1 which further comprises reacting a diene with said ethylene, said olefin being other than ethylene and said metacrylamide.

5. The method of claim 4 wherein said diene is selected from the group consisting of butadiene, 1,4 hexadiene, 5-vinyl-2-norbornene and 5-ethylidene-2-norbornene.

6. The method of claim 1 wherein said N-phenylphenylene metacrylamide is represented by the formula:

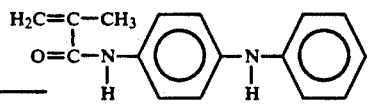

7. A method of making a viscosity index improver which comprises reacting, in one step, ethylene, an olefin other than ethylene and N-phenylphenylene methacrylamide, said reaction occurring in the presence of a cocatalyst system which includes a combination selected from the group consisting of diethylaluminum chloride and vanadium oxytrichloride; ethylaluminum sesquichloride and vanadium oxytrichloride; and diethylaluminum chloride and vanadium tetrachloride.

* * * * *